(12) United States Patent
Iwabuchi

(10) Patent No.: US 6,572,075 B2
(45) Date of Patent: Jun. 3, 2003

(54) VALVE FOR CONTROLLING FLOW RATE OF GAS

(75) Inventor: Toshiaki Iwabuchi, Yabuzuka Honmachi (JP)

(73) Assignee: Kitz SCT Corporation, Tokyo (JP)

( * ) Notice: Subject to any disclaimer, the term of this patent is extended or adjusted under 35 U.S.C. 154(b) by 57 days.

(21) Appl. No.: 09/774,652

(22) Filed: Feb. 1, 2001

(65) Prior Publication Data

US 2001/0010365 A1 Aug. 2, 2001

(30) Foreign Application Priority Data

Feb. 2, 2000 (JP) ........................................ 2000-025773
Nov. 17, 2000 (JP) ........................................ 2000-351739

(51) Int. Cl.[7] ........................................... F16K 31/528
(52) U.S. Cl. ............................... 251/64; 251/69; 251/77; 251/129.03; 251/279
(58) Field of Search ............................ 251/64, 68, 69, 251/70, 71, 129.03, 279, 280, 77

(56) References Cited

U.S. PATENT DOCUMENTS

| | | | | |
|---|---|---|---|---|
| 2,839,929 A | * | 6/1958 | Hurlburt, Jr. | 251/69 X |
| 3,095,901 A | * | 7/1963 | Larson et al | 251/66 X |
| 3,508,446 A | * | 4/1970 | Yeo et al | 251/69 X |
| 3,987,679 A | * | 10/1976 | Condon et al. | 251/69 X |
| 4,974,812 A | * | 12/1990 | Fleming | 251/68 |
| 5,636,652 A | * | 6/1997 | Toschi et al. | 251/129.12 X |
| 5,671,903 A | * | 9/1997 | Homma et al. | 251/69 |
| 6,053,251 A | * | 4/2000 | Deaton | 251/279 X |

* cited by examiner

Primary Examiner—Ehud Gartenberg
Assistant Examiner—Eric Keasel
(74) Attorney, Agent, or Firm—Dennison, Schultz & Dougherty

(57) ABSTRACT

A valve has a valve body having a passage including a hole in which gas flows. A valve disc is provided for closing the hole, and an actuator is provided for operating the valve disc. An emergency cutoff device is provided so that the valve disc closes the hole in an emergency when electric power supply is cut off.

12 Claims, 17 Drawing Sheets

FIG. 10a
FIG. 10b
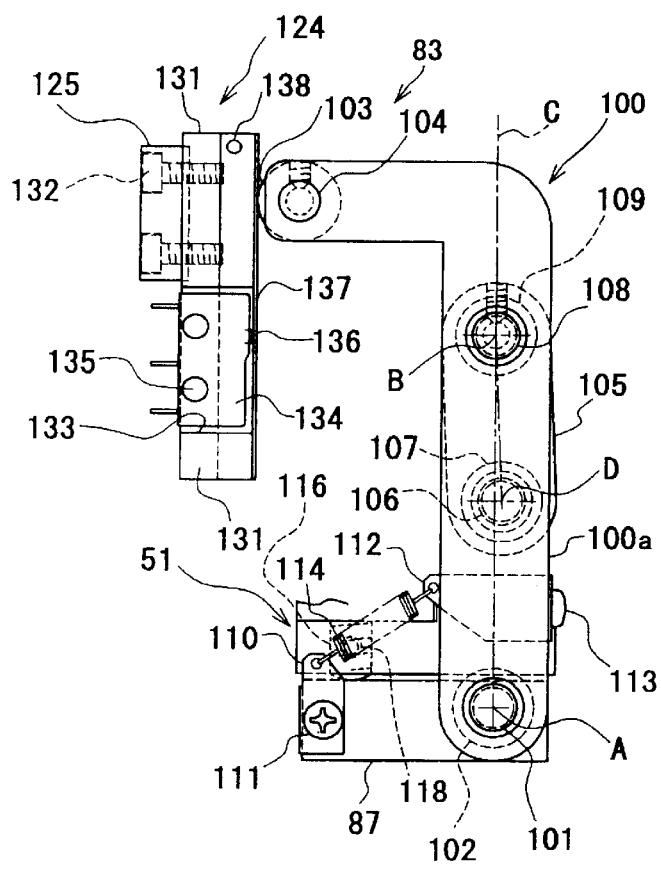
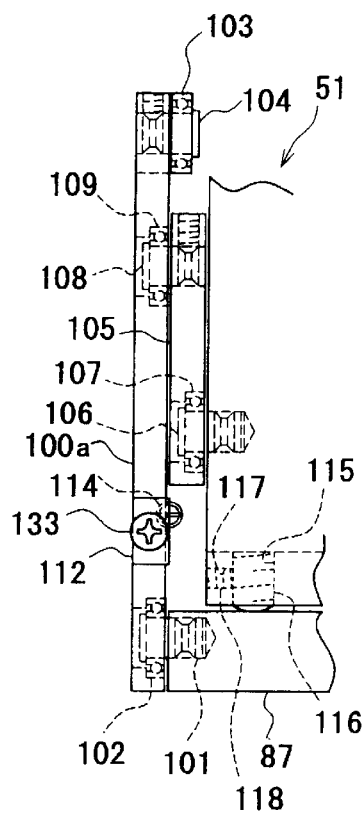

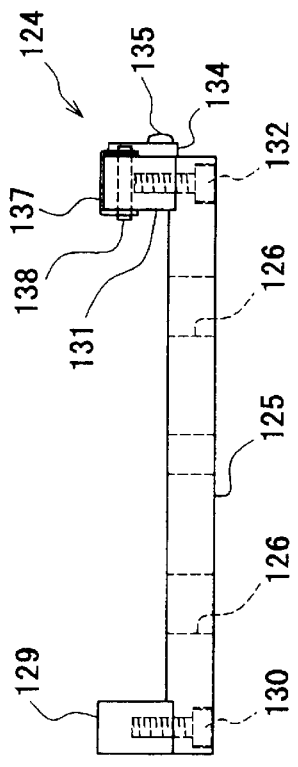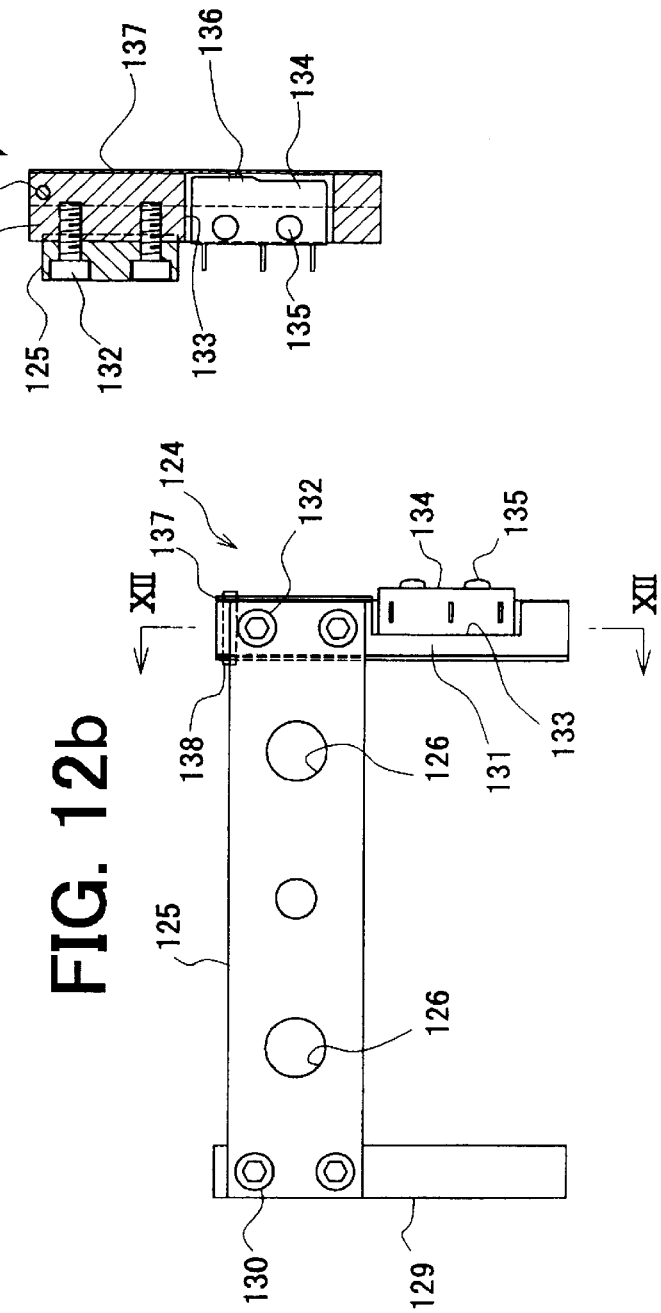

VALVE FOR CONTROLLING FLOW RATE OF GAS

BACKGROUND OF THE INVENTION

The present invention relates to a valve for controlling flow rate of gas, and more particularly to a control valve proper for using in a discharge system and a supply system in a system for manufacturing semiconductors, liquid crystals and others, in particular to a control valve having an emergency cutout mechanism.

In the discharge system of the semiconductor manufacturing system, a needle control valve used for controlling the flow rate of gas. The needle valve is linearly operated by a diaphragm under the condition of a positioning device, or by a screw rotated by a motor.

In the discharge system of the semiconductor manufacturing system, when power supply is cut off without warning in discharge operation by a pump under the controlling of the opening of a passage by the control valve, atmosphere runs back from the stopped pump passing through the passage. As a result, the pressure in the passage quickly increases, so that particles accumulated in the passage are raised and fed to a reaction furnace to contaminate the furnace. In an emergency stop of the pump other than the cut off power, the same trouble as the above occurs.

Therefore, it is necessary to quickly close the control valve at such an emergency in order to prevent the occurrence of the trouble.

However, in the conventional flow rate control valve, an actuator for operating the valve becomes inoperative when the power supply is cut off. About the emergency stop of the pump, no measure is provided. Consequently, the contamination of the reaction furnace can not be prevented, and the furnace must be cleaned, which causes the resumption of manufacturing to delay even if the power is supplied.

It may be considered that an uninterruptible power supply system (UPS) is employed in order to resolve the above described problem. The UPS detects the power cutoff, and supplies power from a battery for several minutes—several tens minutes to operate the actuator of the control valve, thereby closing the valve. However, about two minutes elapse before the closing of the valve, during which the reaction furnace may be polluted.

On the other hand, even if the UPS is provided, the control valve is not closed when the battery is broken, the breaker of the distributor fails, or the wiring is broken.

SUMMARY OF THE INVENTION

An object of the present invention is to provide a control valve which may be urgently and securely closed at an emergency so that the manufacturing operation can be continued without stopping.

According to the present invention, there is provided a valve for controlling flow rate of gas comprising a valve body having a passage including a hole in which gas flows, a valve for closing the hole, an actuator including a slider for operating the valve, an emergency cutoff device connected to the valve and releasably connected to the actuator releasing means for releasing the emergency cutoff device from the actuator in an emergency, urging means for urging the valve to the hole when releasing of the emergency cutoff device.

These and other objects and features of the present invention will become more apparent from the following detailed description with reference to the accompanying drawings.

BRIEF DESCRIPTION OF DRAWINGS

FIG. 1b is an enlarged view of FIG. 1a;

FIG. 3b is an enlarged view of FIG. 3a;

FIG. 10a shows an emergency cutoff mechanism;

FIG. 10b is a side view of the mechanism;

FIGS. 12a and 12b show a guiding means for the emergency cutoff mechanism;

FIG. 12c is a sectional view taken along a line XII—XII of FIG. 12b; and

DETAILED DESCRIPTION OF THE PREFERRED EMBODIMENT

Figure 1A:
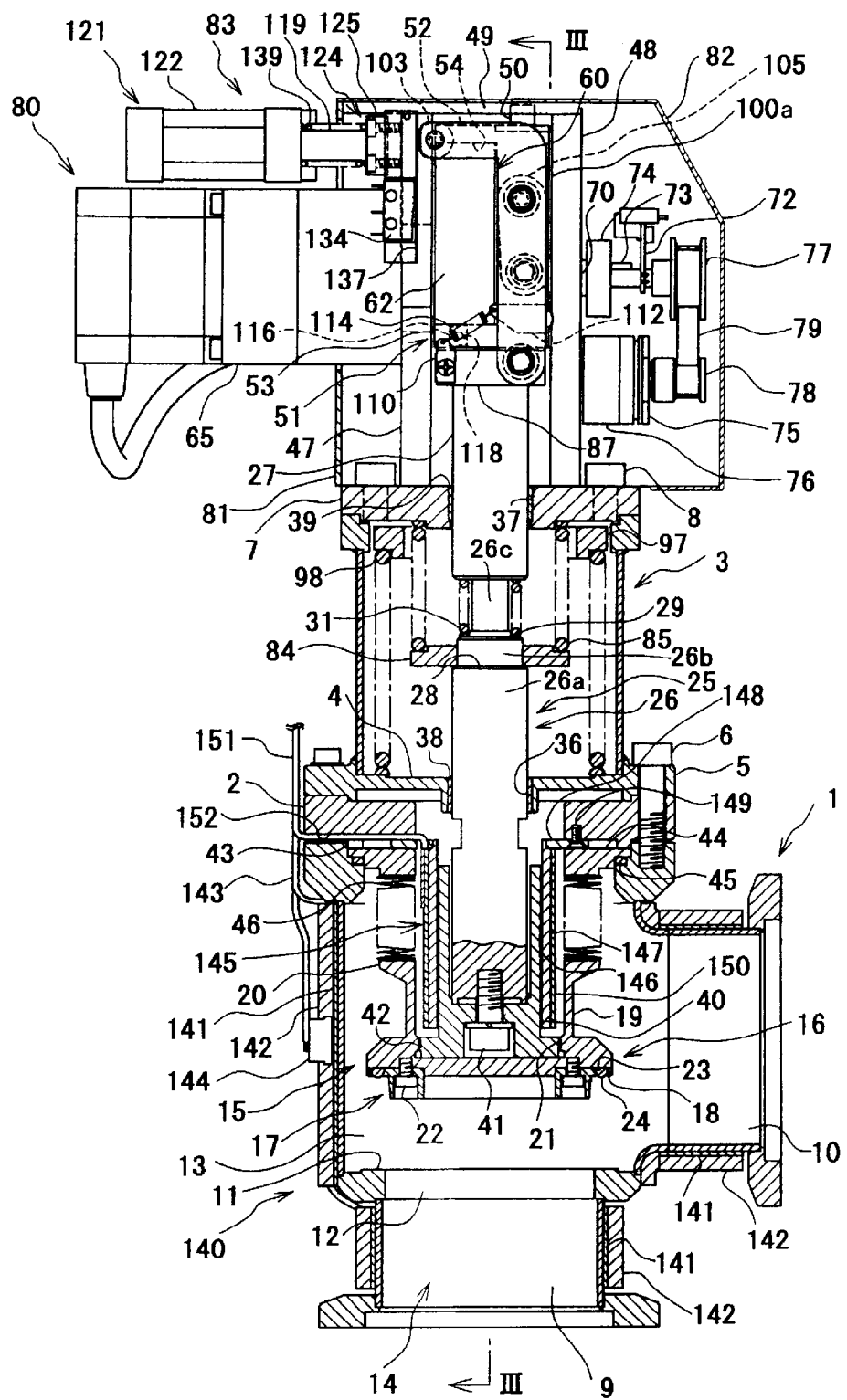
FIG. 1a is a sectional view taken along a line I—I of FIG. 3, showing a flow rate control valve in accordance with the present invention as a first embodiment when the valve is opened in a normal operating condition.

Referring to FIGS. 1 to 6, the valve of the present invention comprises a valve body 1, a bonnet 3 on the valve body 1, an actuator 80 on the bonnet 3. A flange 5 of a bottom plate 4 of the bonnet 3 is fixed to a top open portion of the valve body 1 by bolts 6, interposing an insulation ring 2. An actuator base 7 of the actuator 80 is secured to a top open portion of the bonnet 3 by bolts 8. Ports 9 and 10 are formed in the valve body 1 at a lower portion and a side portion thereof. A valve seat 11 is provided in the valve body 1. The port 9 is communicated with a hole 12 of the valve seat 11, and a passage 14 is formed to communicate with the port 9, hole 12, valve chamber 13 and port 10.

A valve disc 15 is provided in the valve chamber 13. The valve disc 15 comprises a closing portion 16 and an annular needle portion 17. The closing portion 16 has a disc shape and has an annular sealing edge 18 at the periphery thereof. A cylinder 19 is formed on a rear side of the closing portion 16, and a flange 20 is formed on a base portion thereof. On the inside wall of the closing portion 16, a female thread 21 is formed. The needle portion 17 has a diameter smaller than that of the sealing edge 18 and has a short cylindrical shape, and is secured to the front side of the closing portion 16 by bolts 22. The head of the bolt 22 is provided so as not to project from the front side of the needle portion 17. An annular groove 23 formed between the inside wall of the sealing portion 18 and the periphery of the needle portion 17 is gradually reduced toward the outside portion. A seal ring 24 made of elastic material is engaged in the groove 23 so as to project a part of the periphery from the groove. The diameter of the needle portion 17 is gradually reduced toward the outside to form a tapered flow rate control surface.

Figure 8:
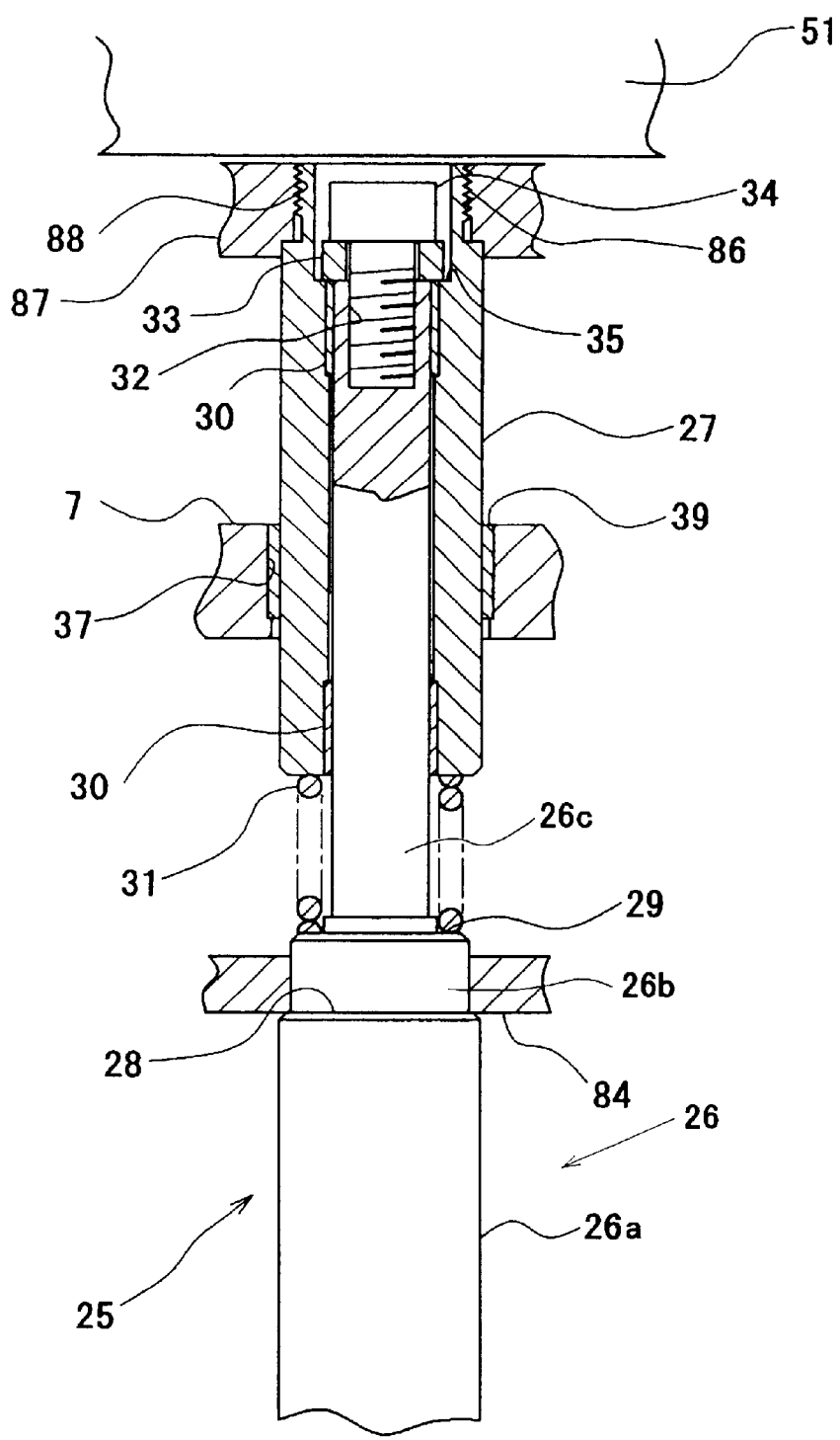
FIG. 8 is an enlarged sectional view of a valve operating member in a valve opening state.
Figure 9:
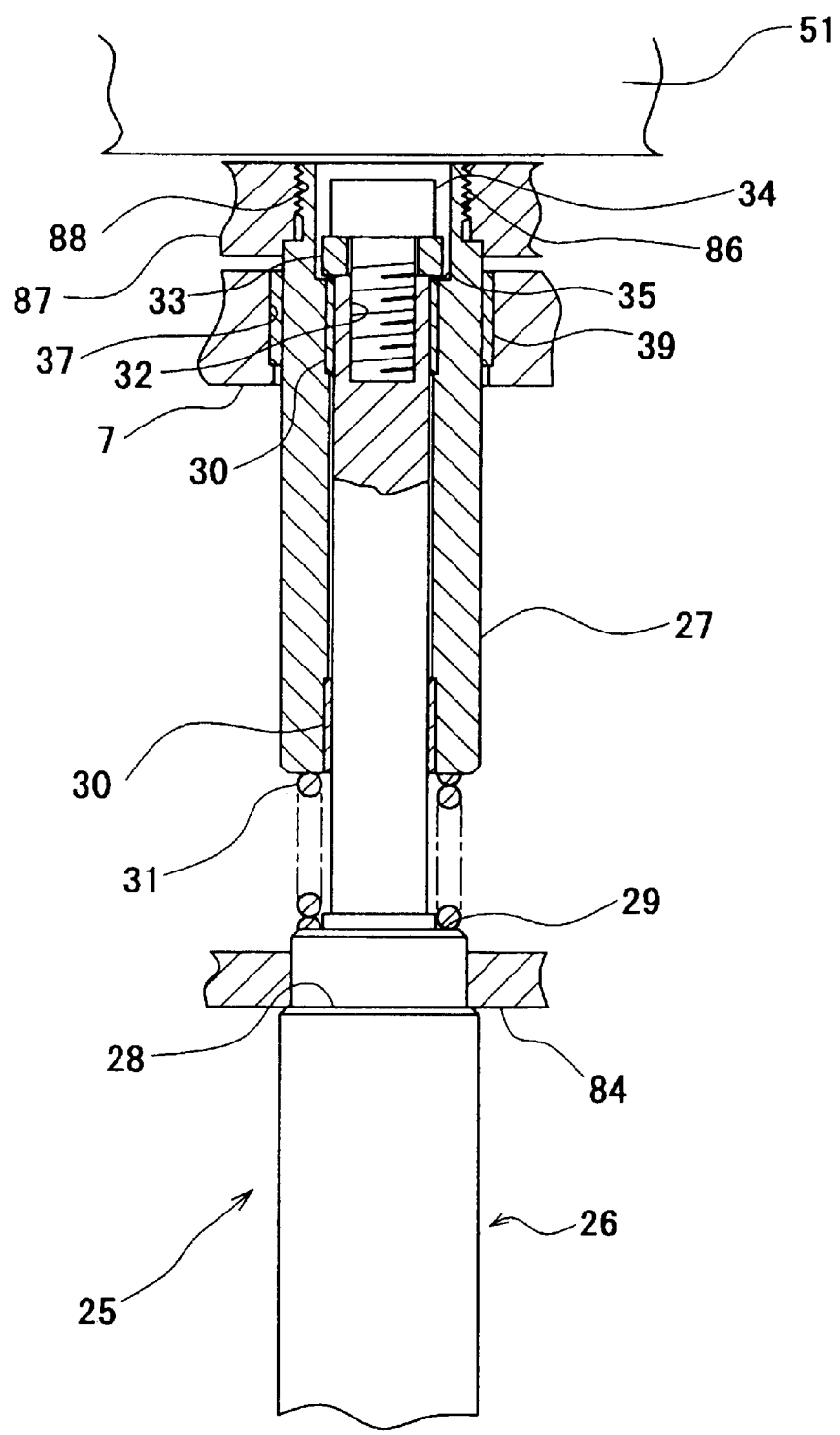
FIG. 9 is an enlarged sectional view of a valve operating member in a valve closing state.

A valve operating member 25 comprises a stem 26 and a stem adapter 27. As shown in FIGS. 8 and 9, the stem 26 comprises stems 26a, 26b and 26c which become stepwisely small diameter, and the stem adapter 27 is slidably mounted on the small diameter stem 26c through a bush 30. A valve closing coil spring 31 is provided between the lower end of the stem adapter 27 and a shoulder 29 of the middle diameter stem 26b.

A female threaded hole 32 is formed in a base end portion of the stem 26c. A screw 34 engaged in a stopper 33 is engaged with the threaded hole 32. Since the stem adapter 27 is held at the position of FIG. 8 as described hereinafter, the large diameter stem 26a is downwardly urged by the spring 31 and the stopper 33 is abutted on a shoulder 35 in a based end portion of the stem adapter 27. Thus, the spring 31 is held in a compressed condition, so as to keep a thrust force for closing the valve.

A male thread 86 formed on an upper portion of the stem adapter 27 engages with a female thread 88 formed in a connector base 87.

Figure 1B:
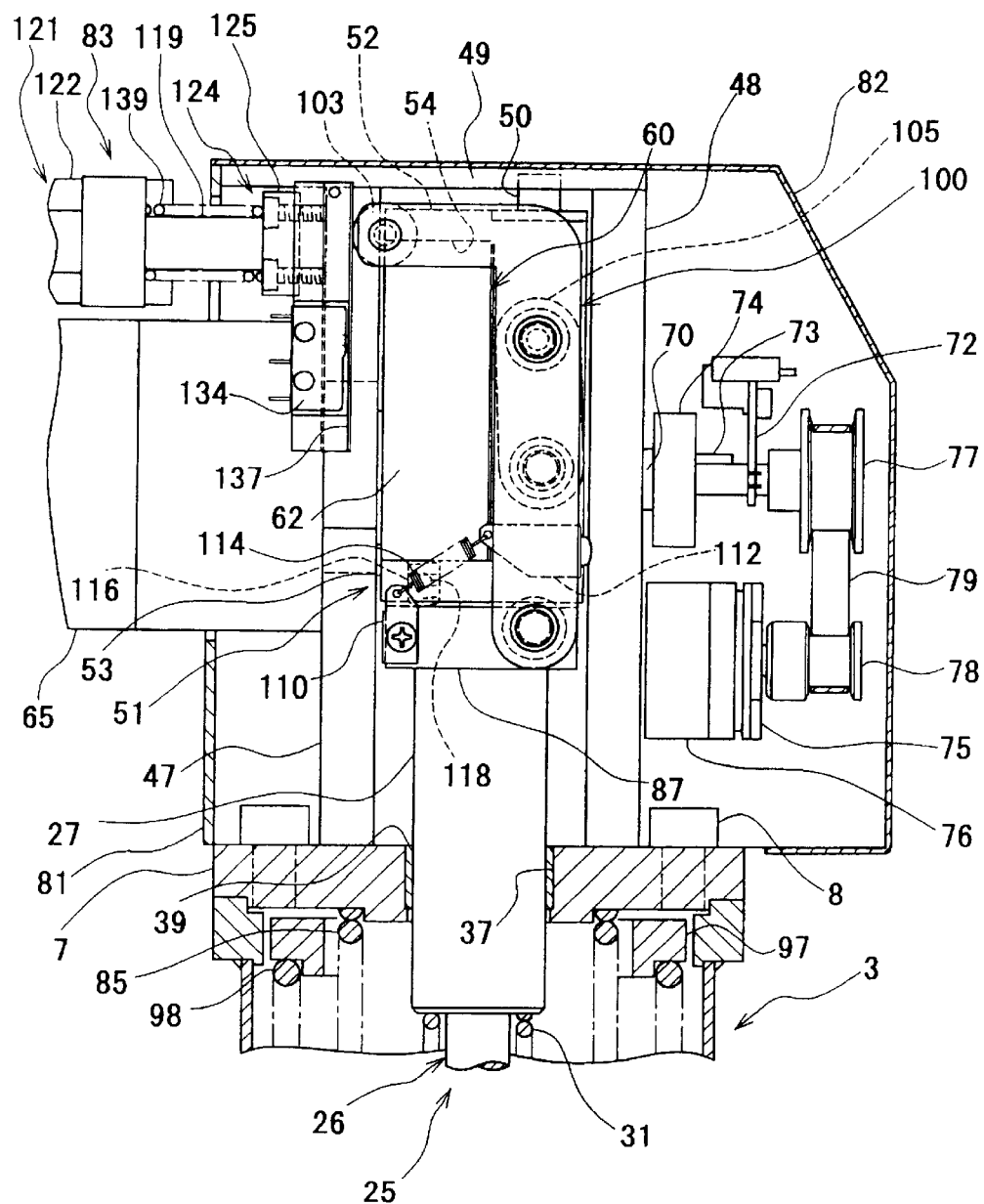

Referring to FIG. 1, the stem 26a is axially slidably mounted in a hole 36 formed in the bottom plate 4 of the bonnet 3 through a bush 38, and the stem adapter 27 is axially slidably mounted in a hole 37 formed in the actuator base 7 through a bush 39. On a lower end portion of the stem 26a, a cylindrical connector 40 is mounted and fixed thereto by a bolt 41. A thread 42 formed on the peripheral wall of a flange of the connector 40 is engaged with the female thread 21 so that the valve disc 15 is connected to the stem 26 through the connector 40.

Figure 5:
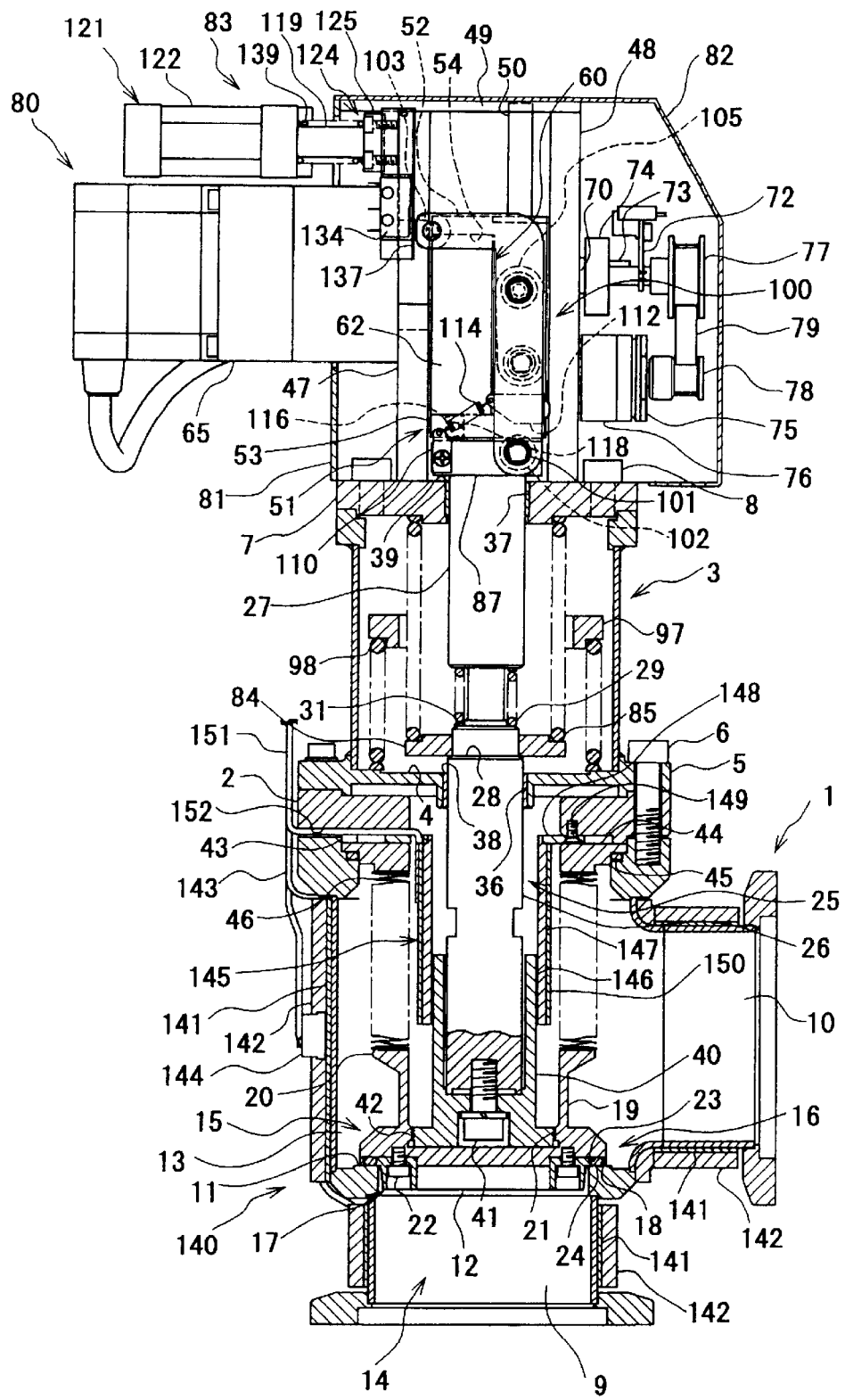
FIG. 5 is a sectional view of the valve of FIG. 1 when the valve is closed.
Figure 6:
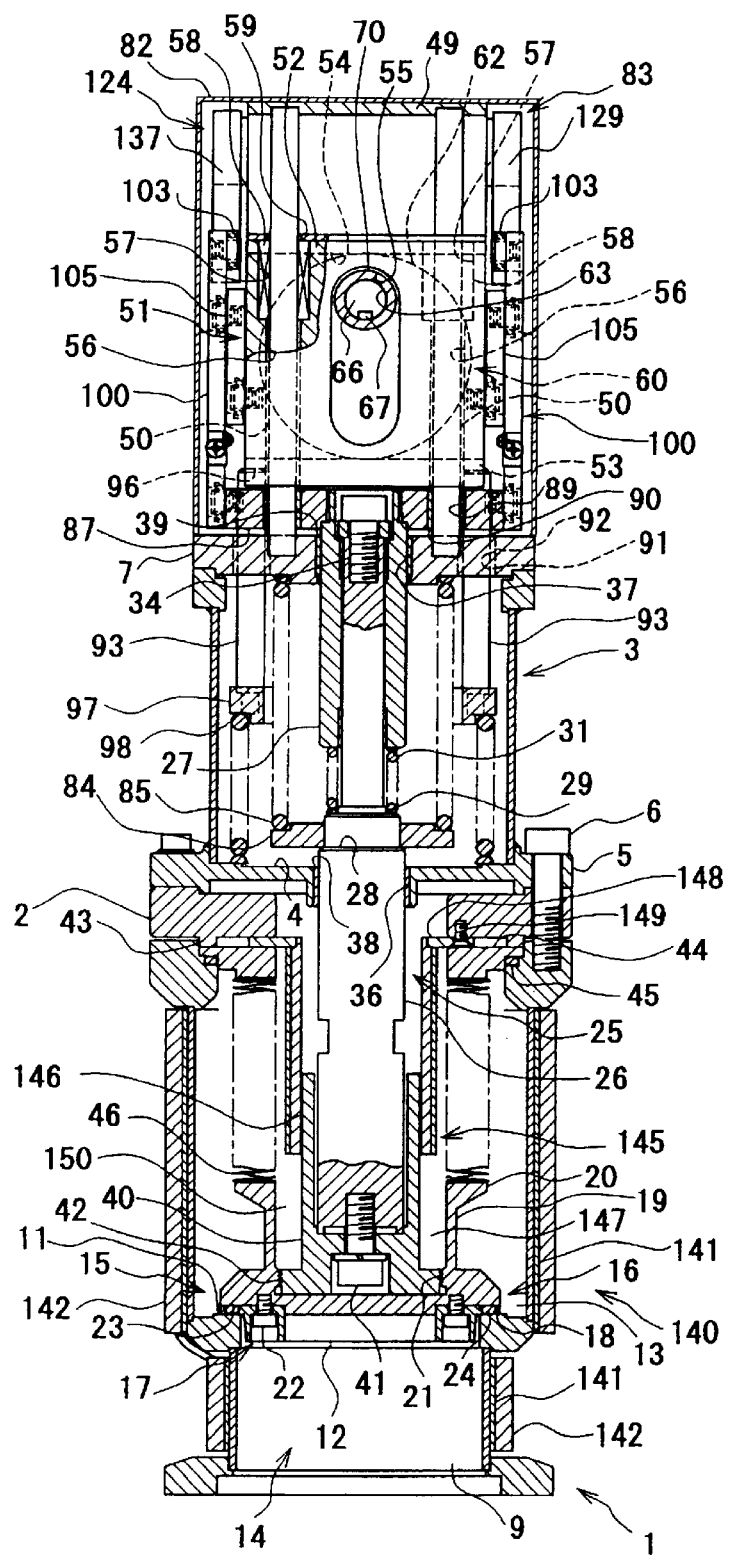
FIG. 6 is a sectional view similar to FIG. 3a in the same condition as FIG. 5.
Figure 7:
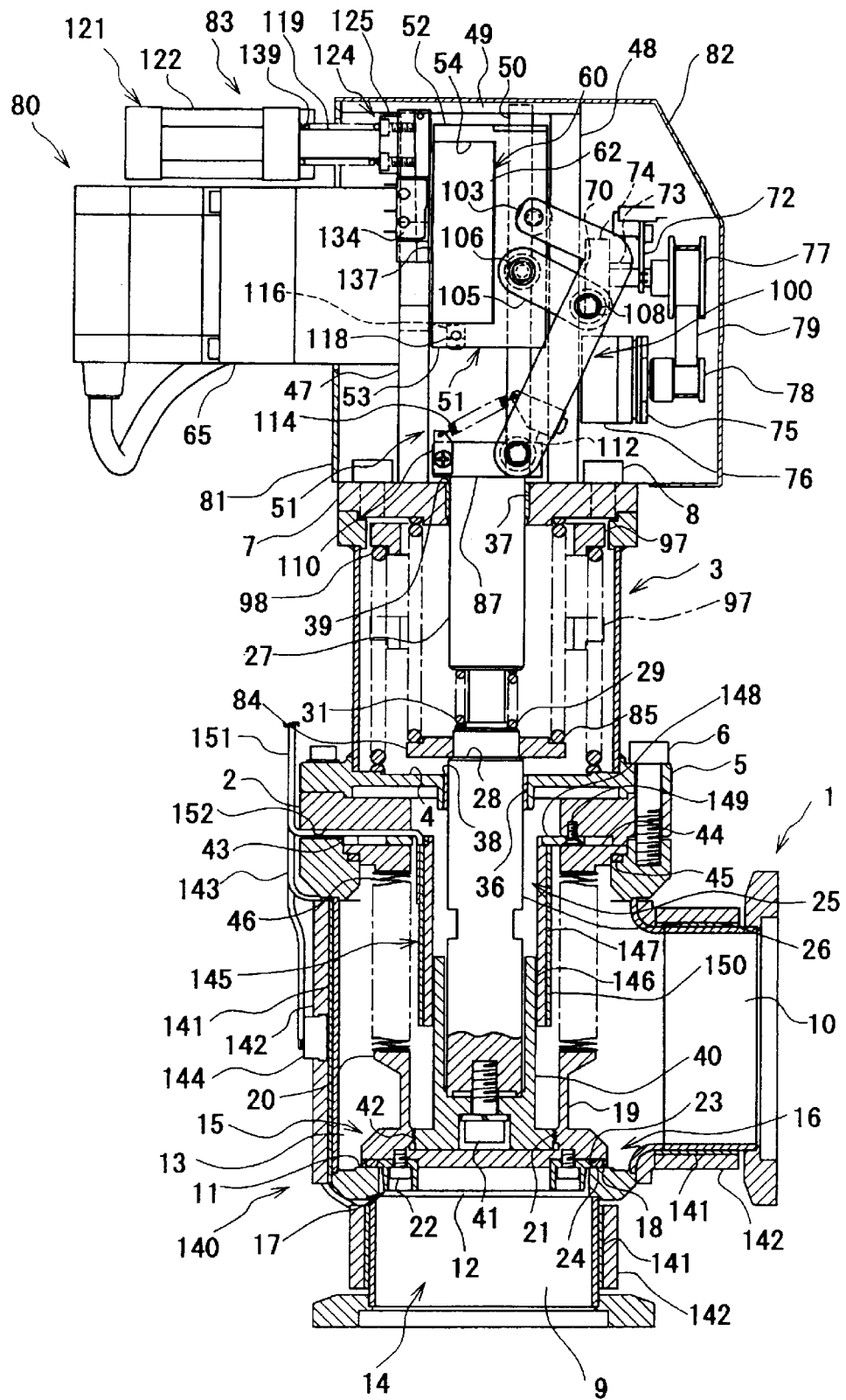
FIG. 7 is a sectional view showing an emergency cutoff state.

When the valve disc 15 is lowered together with the stem 26 as described later, the needle of the valve disc 15 is inserted into the hole 12 of the valve seat 11, and the seal ring 24 of the closing portion 16 is pressed against the valve seat 11 by the spring load of the spring 31. When the stem adapter is further lowered to compress the spring 31 so that the seal ring 24 is pressed against the valve seat 11 at a substantially constant pressure, thereby closing the passage 14 as shown in FIGS. 5 to 7. At that time, a slight gap is formed between the stopper 33 and the shoulder 35 as shown in FIG. 9.

Figure 2:
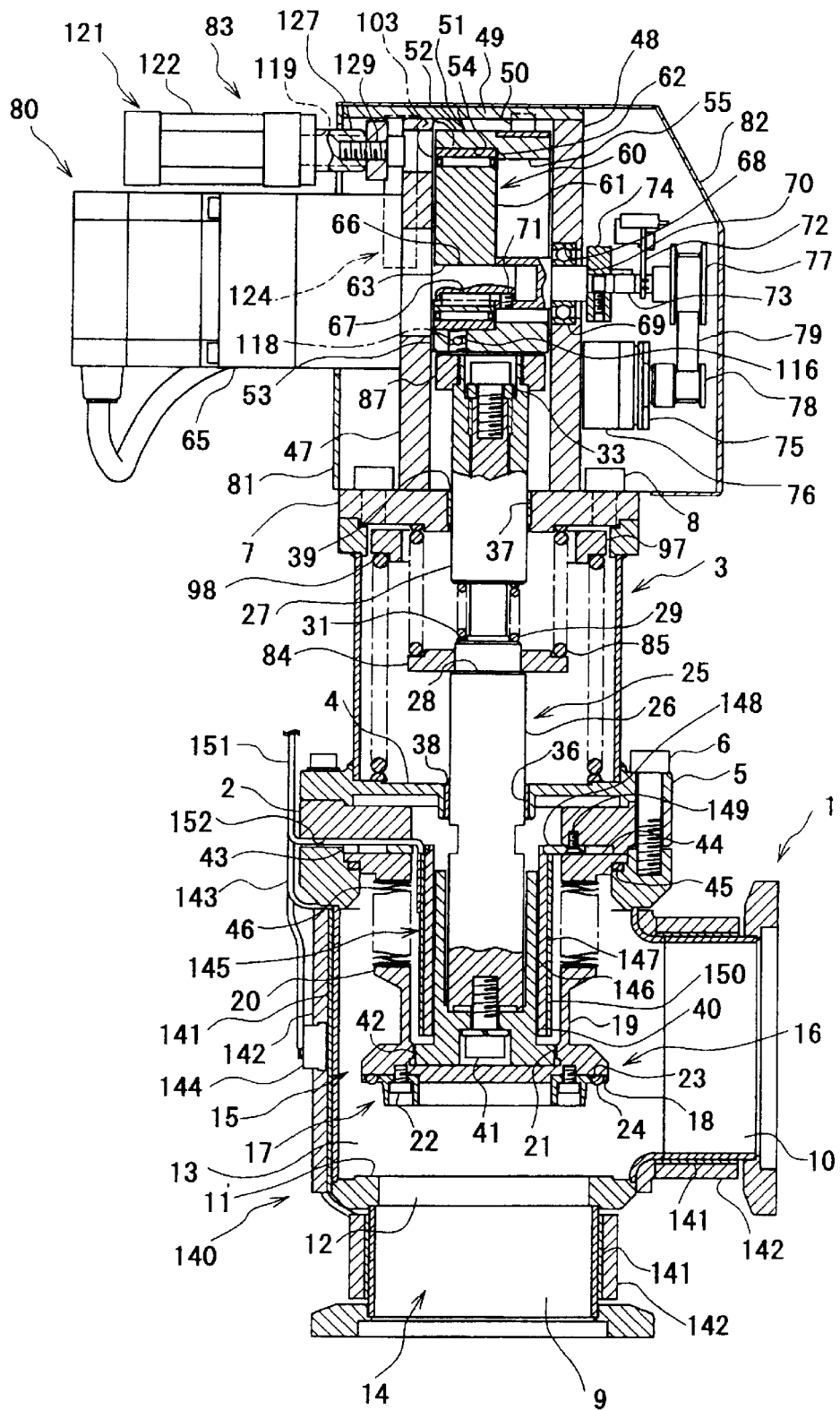
FIG. 2 is a sectional view taken along a line II—II of FIG. 3a, showing the same condition as FIG. 1.

Reversely, when the stem adapter 27 is raised, the shoulder 35 abuts on the stopper 33 (FIG. 8), and then the stem 26 is raised by the stem adapter 27. Thus, the valve disc 15 is removed from the valve sheet 11, and passage 14 is opened (FIGS. 1–3).

Referring to FIG. 1, a supporting member 44 is held between a projection 43 of the underside of the insulation ring of the bonnet 3 and the top of the valve body 1 through a seal member 45.

A bellows 46 is provide between the supporting member 44 and the flange 20 of the cylinder 19 by welding both ends thereof to the member 44 and the flange 20 so as to seal the valve disc 15.

A pair of supporting plates 47 and 48 are secured to the actuator base 7 at both sides of the stem 26 and a holding plate 49 is secured to the tops of the supporting plates.

Figure 3A:
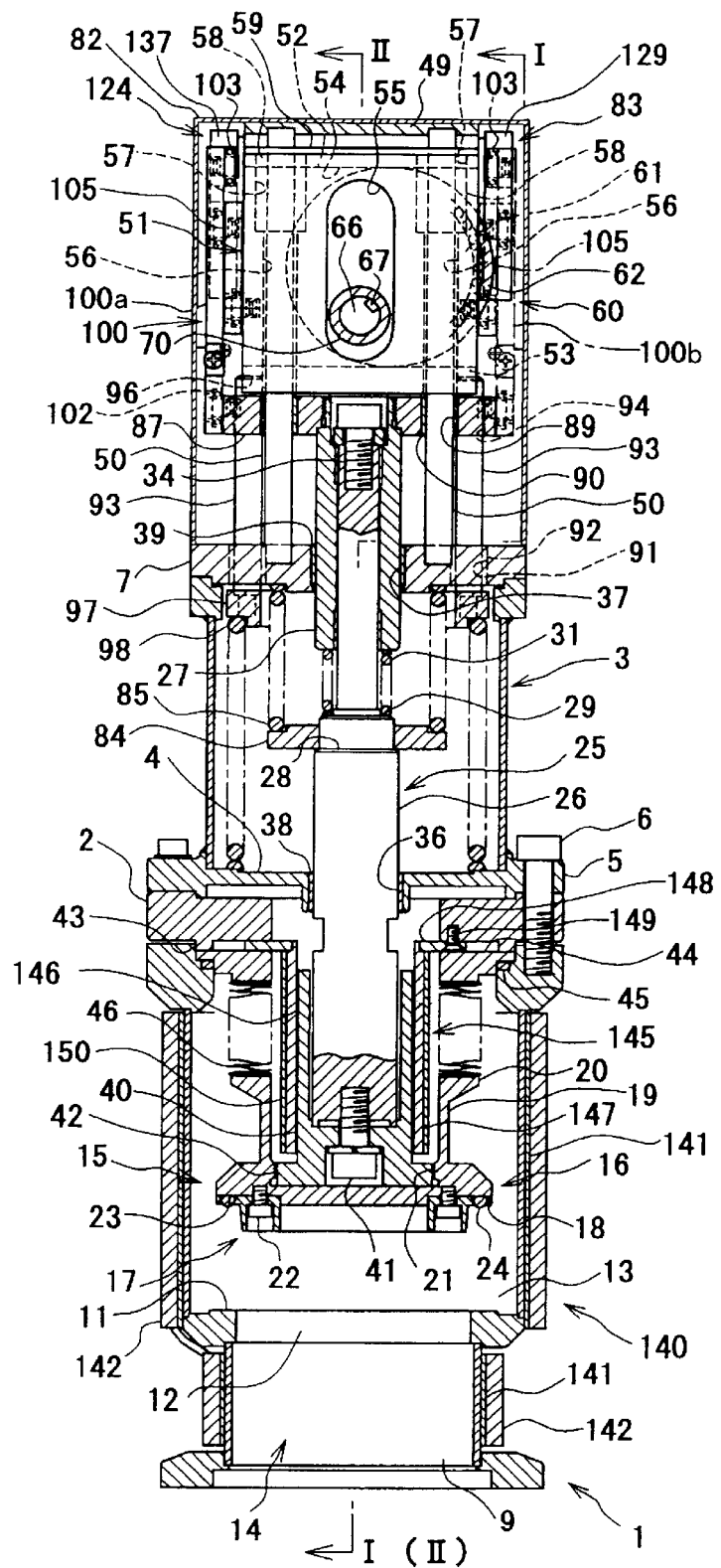
FIG. 3a is a sectional view taken along a line III—III of FIG. 1, showing the same condition as FIG. 1.
Figure 3B:
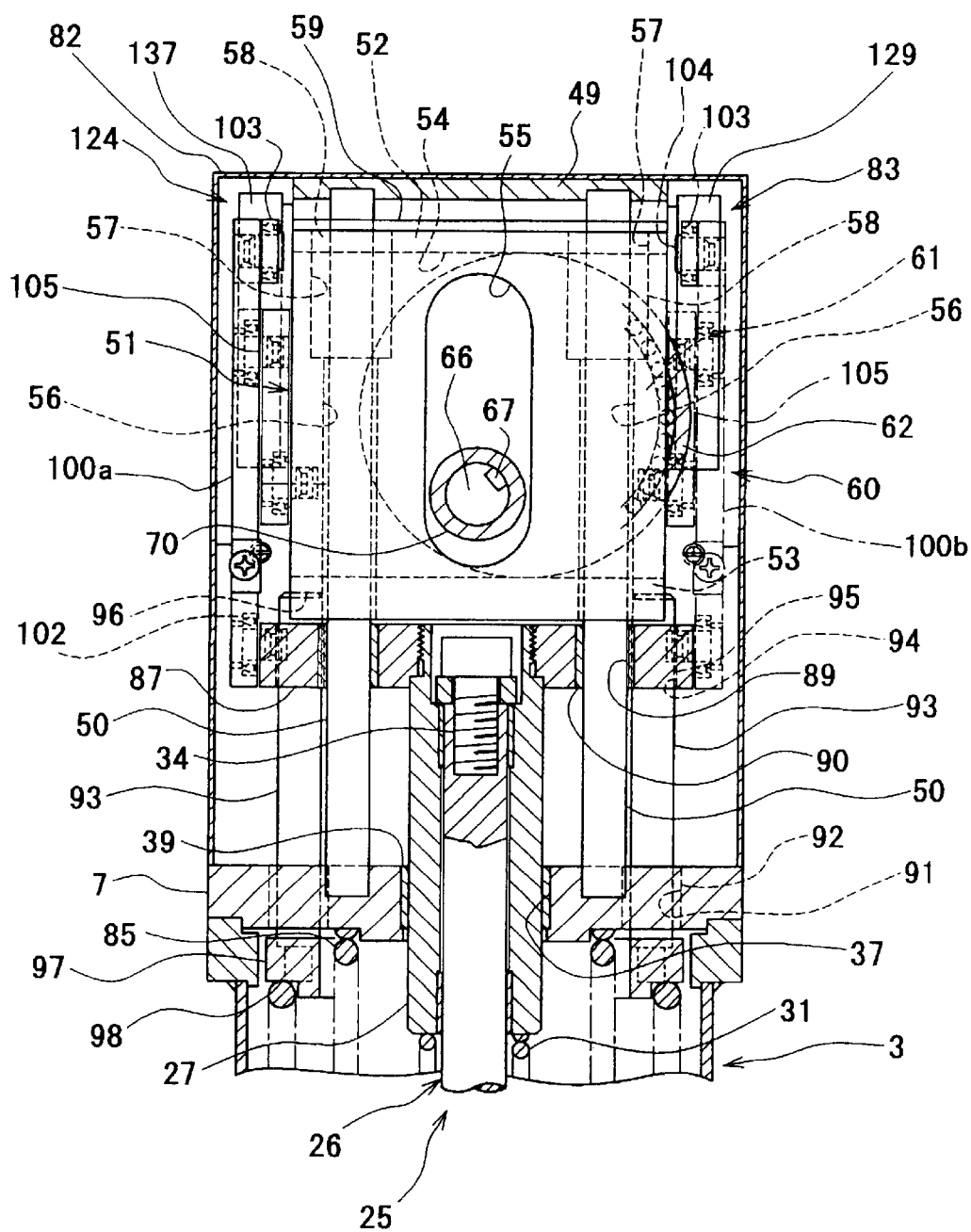
Figure 4:
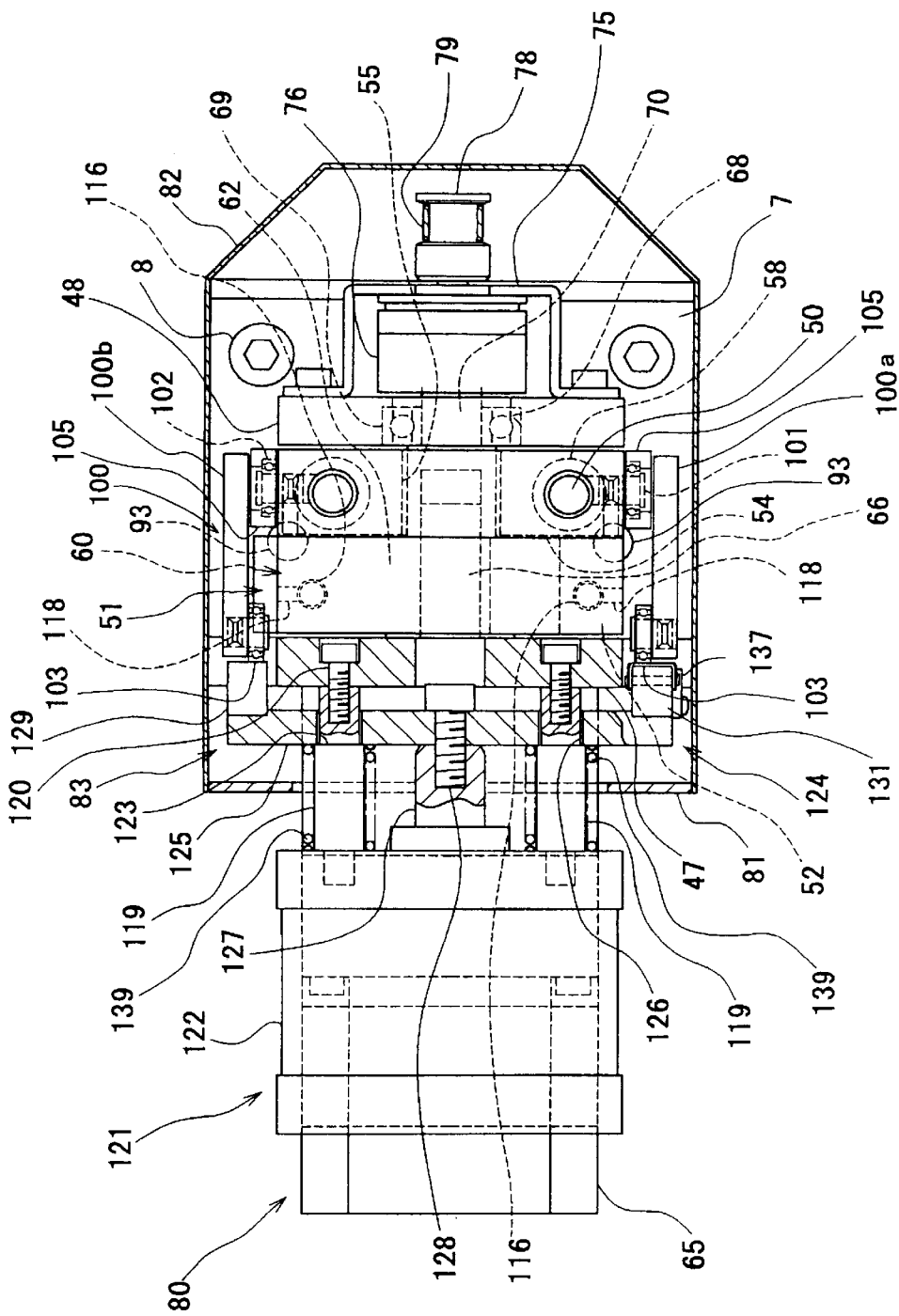
FIG. 4 is a partially sectional plan view of the control valve.

Referring to FIGS. 3 and 4, a pair of parallel guide shafts 50 are secured to the actuator base 7 and to the holding plate 49 at the side of the supporting plate 48.

As shown if FIGS. 1 and 3, a slider 51 of the actuator 80 has an upper guide plate 52 and a lower guide plate 53 projected from the slider to the left in FIG. 1 to form a guide recess 54 there between. A vertically elongated guide hole 55 is formed in the slider 51. As shown in FIG. 3a, a pair of vertically elongated holes 56 are formed in the slider 51 at opposite sides of the elongated guide holes 55. In upper end portion of each hole 56, a large diameter hole 57 is formed, in which linear bearing 58 is provided. The linear bearing 58 is held by a holding plate 59 fixed to the top of the slider 51 by screws. The slider 51 is mounted on the shafts 50 at the holes 56 and vertically slidably held by the linear bearing 58.

Referring to FIGS. 2 and 3, an eccentric cam 60 comprises an eccentric disc 61 having an eccentric hole 63. The eccentric disc 61 is rotatably mounted in the guide recess 54 of the slider 51 through a needle bearing 62 to provide the actuator. The outer race of the needle bearing 62 is slidably held by the upper and lower guide plates 52 and 53 so as to move in the horizontal direction.

Referring to FIG. 2, a stepping motor 65 is secured to the supporting plate 47 at the front surface thereof. A horizontal output drive shaft 66 of the motor 65 is inserted in the eccentric hole 63 and secured thereto by a key 67. The actuator 80 is thus composed. The end of the output shaft 66 is inserted in a hole of a shaft 70 and fixed to the shaft 70 by a screw 71. The shaft 70 is rotatably supported by a bearing 69 provided in a hole 68 of the supporting plate 48. The shaft 70 is slidably engaged in the elongated hole 55 of the slider 51. Thus, when the driving shaft 66 is rotated, the eccentric cam 60 is rotated to vertically move the slider 51 along the shafts 50, thereby lowering the stem 26 and valve disc 15 so that the valve disc 15 cuts off the hole 12 of the valve seat 11 as described later.

A supporting frame 72 is securely mounted on the supporting plate 48 at a base portion (not shown), a photo sensor 73 is attached to the supporting frame 72. A sensor dog 74 is attached to an end portion of the shaft 70. The photo sensor 73 and the sensor dog 74 are so arranged as to detect the rotating angle of the eccentric cam 60 so that the closing and opening of the hole 12 of the valve seat 11 by the valve disc 15 can be detected.

A supporting frame 75 is mounted on the supporting plate 48, and a potentiometer 76 is attached to the supporting frame 75. A pulley 77 is secured to the end of the shaft 70, and a pulley 78 is mounted on the shaft of the potentiometer 76. A timing belt 79 is engaged with the pulleys 77 and 78.

Thus, when the eccentric cam 60 is rotated, the shaft of the potentiometer 76 is rotated. Therefore, the rotating angle of the eccentric cam 60 that is the closing condition of the valve seat 11 is detected based on the output of the potentiometer 76. The output of the potentiometer 76 is fed back to the stepping motor 65.

The above described actuator 80 is covered by covers 81 and 82 except for the stepping motor 65.

The above described valve operating member 25 comprising stem 26, stem adapter 27 and others and the actuator 80 are releasably connected together by an emergency cutoff mechanism 83 in accordance with the present invention as described hereinafter.

Referring to FIG. 1, a spring retainer 84 is mounted on the stem 26b. A spring 85 is provided between the spring retainer 84 and the actuator base 7, so that the spring retainer 84 is engaged with a shoulder 28, thereby urging the valve operating member 25 and hence the valve disc 15 toward the valve seat 11. As shown in FIG. 3a, the connector base 87 secured to the stem adapter 27 is slidably mounted on the guide shafts 50 at holes 89 through bushes 90. A pair of holes 91 are formed in the actuator base 7, and a pair of rods 93 are slidably engaged with the holes 91 through bushes 92. Each of the rods 93 is slidably engaged with a hole 94 of the connector base 87, and the upper end of each rod 93 is engaged with a recess 96 of the slider 51. The lower end of each rod 93 is secured to an annular spring retainer 97, and a spring 98 is provided between the base plate 4 of the bonnet 3 and the spring retainer 97, thereby upwardly urging the spring retainer 97, rods 93 and slider 51. The spring 98 is provided for assisting the valve disc 15 in opening against the elastic force of the spring 85.

Referring to FIGS. 3, 10a through 11, the connector base 87 is extended in a direction perpendicular to the axis of the output shaft 66, and a pair of L-shaped link 100 are rotatably mounted on the connector base 87 at respective both end portions. More particularly, a shaft 101 is fixed to the connector base 87 at each end, and a bearing 102 provided in the links 100a and 100b at a lower end portion is engaged with the shaft 101 so that each link 100 is rotatably attached to the connector base 87. A roller 103 is rotatably mounted on a shaft 104 secured to a free end portion of each link 100. A link 105 is rotatably attached to the link 100 by a bearing 109 provided in the link 100 and a shaft 108 secured to the link 105 at an upper end thereof. The lower end of the link 105 is rotatably attached to a side of the slider 51 by a bearing 107 provided in the link 105 and a shaft 106 secured to the side of the slider 51. At each end of the connector base 87, a spring holder 110 is fixed by a screw 111, and a spring holder 112 is fixed to the link 100 at a lower portion thereof by a screw 113. A spring 114 is provide between the spring holders 110 and 112 so that the roller 103 is abutted on a latch rail cover 137 which will be described hereinafter, thereby holding the link 100 vertical.

Referring to FIGS. 4 and 10b, an adjust screw 116 is engaged with a threaded hole 115 formed in the underside of the slider 51 and fixed thereto by a screw 118 engaged with a threaded hole 117. The lower end of to adjust screw 116 is projected from the underside of the slider 51 and mounted on the connector base 87. The gap between the slider 51 and the base 87 can be adjusted by changing the projecting length of the adjust screw 116.

Referring to FIGS. 1 and 4, a pair of cylindrical support shafts 119 are fixed to the supporting plate 47 by screws 120 to be outwardly projected from the cover 81. On the projected ends of the shafts 119, an air cylinder 122 of an air cylinder device 121 is mounted. Each of the shafts 119 has a small diameter portion on which a horizontal yoke 125 of a latch device 124 is slidably mounted at holes 126 (FIG. 12b). A piston rod 127 of the air cylinder device 121 is connected to the yoke 125 by a screw 128. A spring 139 is provided around each shaft 119 and disposed between the air cylinder 122 and the yoke 125.

Referring to FIGS. 10 through 12c, a pair of vertical latch rails 129 and 131 are secured to both ends of the yoke 125 by screws 130 and 132. A recess 133 is formed in a lower portion of the rail 131, and a microswitch 134 is fixed in the recess 133 by screws 135. As shown in FIGS. 12a–12c, a rail cover 137 having a U-shaped sectional shape is rotatably mounted by a spring loaded pin 138 at an upper end portion thereof, and urged by the spring loaded pin 138 to push an operating rod 136 of the microswitch 134 so as to open the switch 134.

As shown in FIGS. 3 and 4, the roller 103 of the link 100a engages with rail cover 137 and the roller 103 of the link 100b directly engages with the rail 129.

In the electric power supply condition, compressed air is supplied to a piston side chamber of the air cylinder 122 passing through an electromagnetic valve (not shown), so that the piston rod 127 is moved to the left in FIGS. 1 and 4. Therefore, the yoke 127 is moved to the left against the springs 139 to engage the yoke to a shoulder 123 of each shaft 119, which is the normal condition.

In the normal condition shown in FIG. 10a, the yoke 125 and rails 129 and 131 are located at the left end position, where the line C connecting the center A at the connection of link 100a to the connector base 87 with the center B of the connection of the link 100a to the link 105 is positioned at an inner position than the center D at the connection of the link 105 to the slider 51. At the connection of the link 105 of the emergency cutoff mechanism 83 to the slider 51 of the actuator 80 is not disconnected, since the relative position of the link 105 to the link 100a does not change.

Referring to FIG. 2, the spring 85 downwardly urges the connector base 87 through the spring retainer 84, stem 26, stopper 33, and stem adapter 27, so that the link 100a (FIG. 10a) is urged so as to rotate in the counterclockwise direction about the center D, because of the inward deflection of the line C from the center D. However, the roller 103 is pressed against the rail 131 through the rail cover 137, the link 100a is not rotated. Thus, the normal condition is stably held, and hence the emergency cutoff mechanism 83 is kept stable and inoperative. Thus, the slider 51 of the actuator 80 and the valve operating member 25 are connected with each other through the emergency cutoff mechanism 83.

When the power supply is cutoff, which is the emergency, the electromagnetic valve is de-energized to change the compressed air passage so that the compressed air in the piston rod side chamber of the air cylinder 121 is discharged to the atmosphere. Thus, the yoke 125 is moved to the right by the springs 139.

Figure 11:
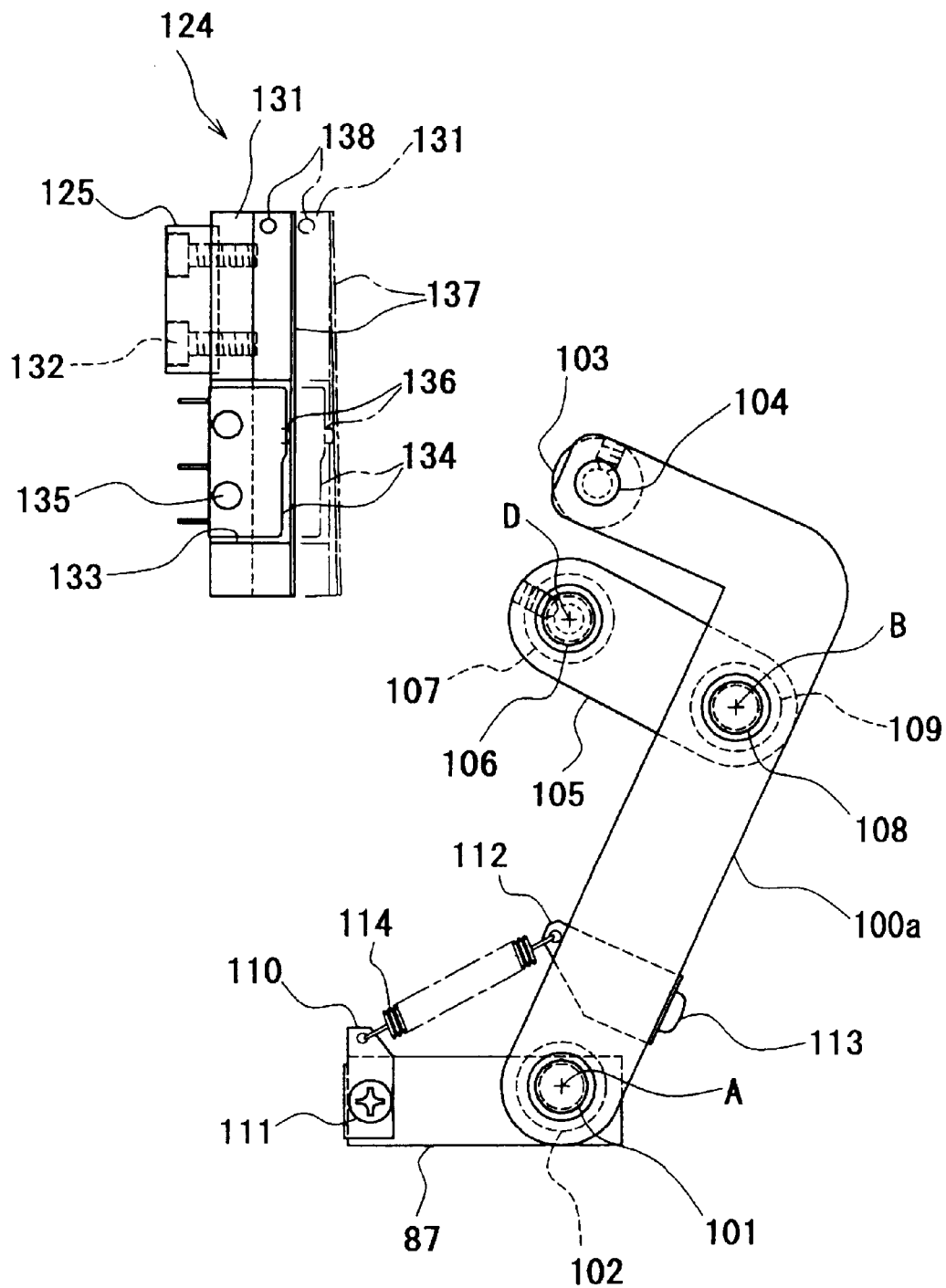
FIG. 11 shows the mechanism in an emergency cutoff state.

Consequently, the latch rail 131 is moved to the position shown by the dot-dash line in FIG. 11, so that the link 100 is rotated in the clockwise direction about the center A together with the roller 103. As a result, the line C connecting the center A to the center B is moved to the outerside of the center D, where the link 100 can be freely rotated in the clockwise direction. Namely, the emergency cutoff mechanism 83 is substantially disconnected from the slider 51.

Since the spring 85 (FIG. 1) downwardly urges the connector base 87 as described above, the links 100 and 105 are rotated in the clockwise direction against the spring 114 as shown in FIG. 11, where the valve disc 15 closes the hole 12 as described hereinafter. In the position of FIG. 11, the link 105 has not sufficient force to downwardly move the slider 51. Referring to FIG. 1, an outer heating means 140 is provided to surround the passage 14. The heating means 140 comprises a silicon rubber flat heater 141 in which a heating wire is embedded, and an insulating cover 142 made of silicon sponge which covers the flat heater 141. The flat heater 141 contacts with the peripheral wall of the valve body 1. A wire 143 connected to the heating wire of the flat heating 141 is connected to the power source through a thermostat 144.

An inner heating means 145 is provided to surround a lower end portion of the stem 26. The inner heating means 145 comprises a heater sleeve 147 surrounding a cylindrical portion 146 of the connector 40, and a flat heater 150, same as the flat heater 141, fixed to the heater sleeve 147. The heater sleeve 147 is secured to the insulation ring 2 at a flange 148 thereof by screws 149. A gap is formed between the heater sleeve 147 and the cylindrical portion 146 which is axially moved. A wire 151 connected to the heating wire in the flat heater 150 is connected to the power source, passing through a groove 152 formed in the underside of the insulation ring 2.

In each of the flat heaters 141 and 150, a thermocouple (not shown) is embedded and connected to a heat controller (not shown), so that the temperature of each heater is controlled based on the signal from the thermocouple.

The operation in the normal condition will be described hereinafter. As described above, in the normal condition, compressed air is supplied to the piston side chamber of the air cylinder 122, the emergency cutoff mechanism 83 is kept stable and inoperative as shown in FIG. 10a.

Referring to FIGS. 1 to 3b showing the valve open state, when the stepping motor 65 is operated to rotate the output shaft 66, the eccentric disc 61 rotates in the clockwise direction about 140 degrees in FIG. 3a. Consequently, as shown in FIGS. 5 and 6, the slider 51 is lowered, thereby lowering the connection base 87 through the links 105 and 100. Thus, the stem adaptor 27, stem 26, connector 40 and valve disc 15 are lowered, while the spring 98 is compressed because of the lowering of rods 93 (FIG. 6) and the spring retainer 97. During the lowering of the slider 51, since the adjust screw 116 also pushes the connector base 87, the link 105 is not applied with an excessive thrust force.

On the other hand, the roller 103 rolls on the rail cover 137, thereby to keep the microswitch 134 open during the lowering of the slider 51.

The flow rate adjusting surface of the needle valve 17 is gradually inserted in the hole 22 by the elastic force of the spring 31 to control the flow rate of the gas. The seal ring 24 is pressed against the valve seat 11 to completely cut off the valve. The valve cutoff force is kept constant by the elastic force of the spring 31. Moreover, the valve cutoff force can be easily set by the spring 31.

When the stepping motor 65 is driven to reversely rotate the output shaft 66 and the eccentric cam 60, about 140 degree, the slider 51 is raised from the position of FIG. 5. By the rising of the slider 51, the stem adapter 27 is lifted through links 105, 100 and connector base 87. When the adapter 27 is slightly raised from the position of FIG. 9, the shoulder 35 of the stem adapter 27 engages with the stopper 33. Thereafter the stem 26 and the valve disc 15 are also raised to open the valve. The slider 51 is upwardly urged by the spring 98 through the spring retainer 97 and rods 93, thereby reducing the repulsion force of the spring 85. This means that the power of the stepping motor 65 can be reduced.

The rotating angle of the eccentric cam 60 is detected by the photo sensor 73 and potentiometer 76, thereby feedback-controlling the stepping motor 65. Thus, it is possible to exactly set the opening degree of the valve disc 15.

Since the valve disc 15 is operated in the sine curve motion by the cross slider crank mechanism, the valve disc is operated at a high speed in a medium range, and operated at near the top portion of the sine curve in a minimum range. Thus, the solving power can be increased.

Therefore, both high speed operation and the high controllability in a high pressure range are satisfied.

The valve disc is provided with a needle portion and a closing portion 17, namely a single unit has the flow rate control function and the cut off function. Therefore, the range-ability becomes large and the control range becomes wide. Thus, it is possible to control the process pressure and cleaning pressure in the semiconductor manufacturing system.

The cross slider crank mechanism comprises a slider having a recess and an eccentric cam provided in the recess, the hole of the valve is closed by the bottom dead center of the eccentric cam. Therefore, the valve is closed in the power cut off state, thereby preventing leakage of the gas.

The operation in an emergency will be described hereinafter.

When the electric power supply is cut off, the electromagnetic valve is de-energized to change the air passage, thereby to discharge the compressed air in the piston rod side chamber of the air cylinder 121. At that time, if the stepping motor 65 is operated, the operation stops to stop the needle valve 17 at an intermediate position between the top and the bottom dead center.

As described above, when the compressed air is discharged from the air cylinder 121, the yoke 125 and the latch rails 129 and 131 are moved to the right in FIG. 10a by the springs 139, so that the link 100 is clockwisely rotated about the center A together with the link 105. As a result the relative position relationship between link 100 and link 105 is inverted to the cutoff condition where the link 100 can freely the rotated in clockwise direction. Thus, the links 100 and 105 are clockwisely rotated and the connector base 87 is lowered by the spring 85 as shown in FIG. 7 so that the stem 26 and hence the needle valve 17 are lowered to close the hole 12, thereby closing the passage 14. During the emergency cutoff operation, the slider 51 does not descend as described above.

When the roller 103 removes from the rail cover 137, the microswitch 134 is closed, so that the occurring of the emergency is alarmed.

It is not necessary to provide the UPS for the valve of the present invention, because the valve is closed before the power supply through the UPS.

When the electric power is resupplied, the electromagnetic valve is energized to supply compressed air to the piston rod side chamber of the air cylinder 121 whereby the yoke 125 is moved to the left against springs 139. When the slider 51 is lowered by the operation of the motor 65 and the eccentric cam 60, the shaft 106 connecting the link 105, to the slider 51 is also lowered, thereby rotating links 105 and 100 in the counterclockwise direction in FIG. 11. Thus, the links 100 and 105 return to the normal and stable position shown in FIG. 5, where the roller 103 is pressed against the latch rail 131 through the cover 137, and the line C is shifted to the inner side position than the center D. Therefore, the emergency cutoff mechanism 83 is kept stable and the needle valve 17 securely closes the passage 14 by the elastic forces of springs 31 and 85.

Figure 13:
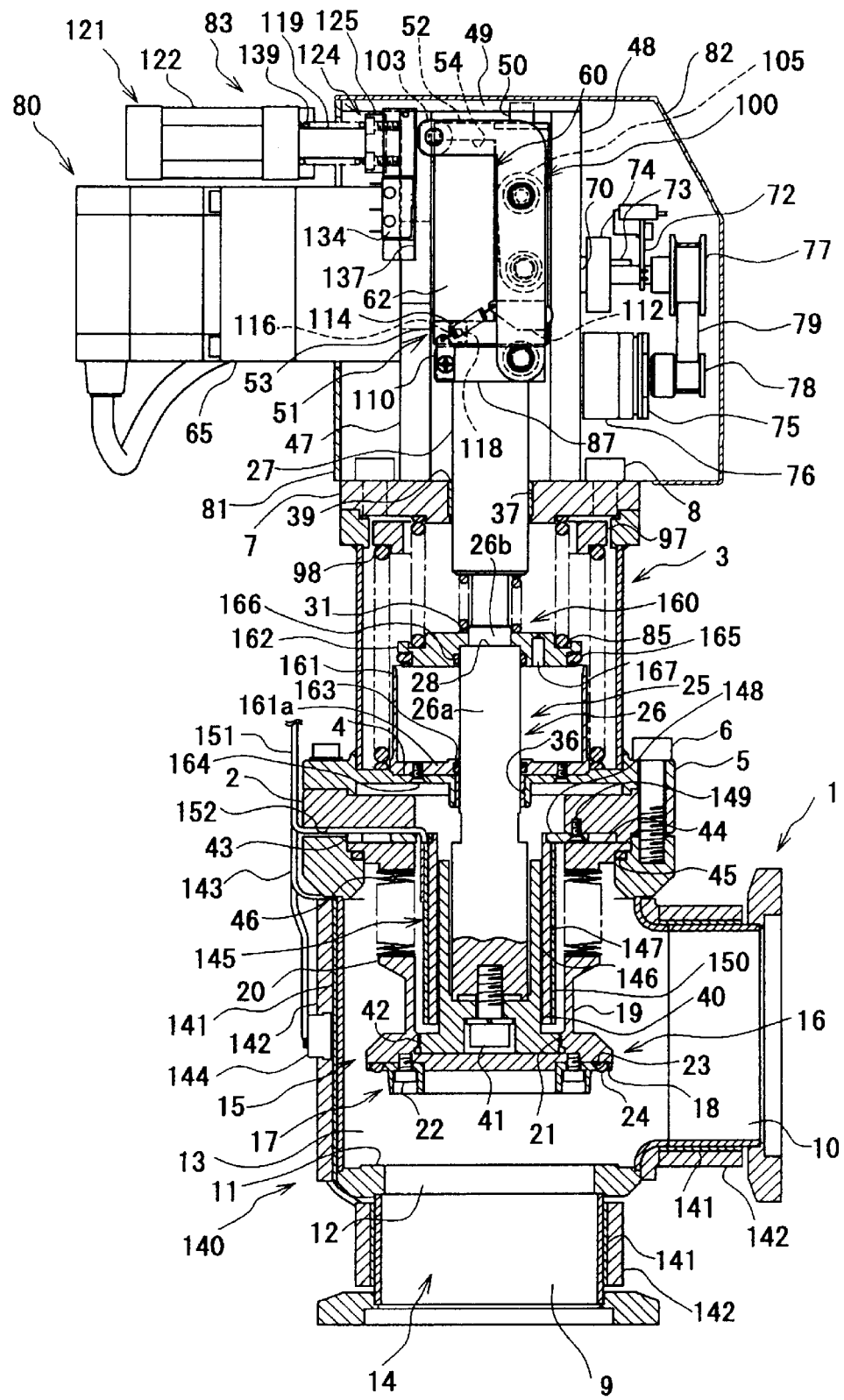
FIGS. 13 to 15 show a second embodiment of the present invention.
Figure 14:
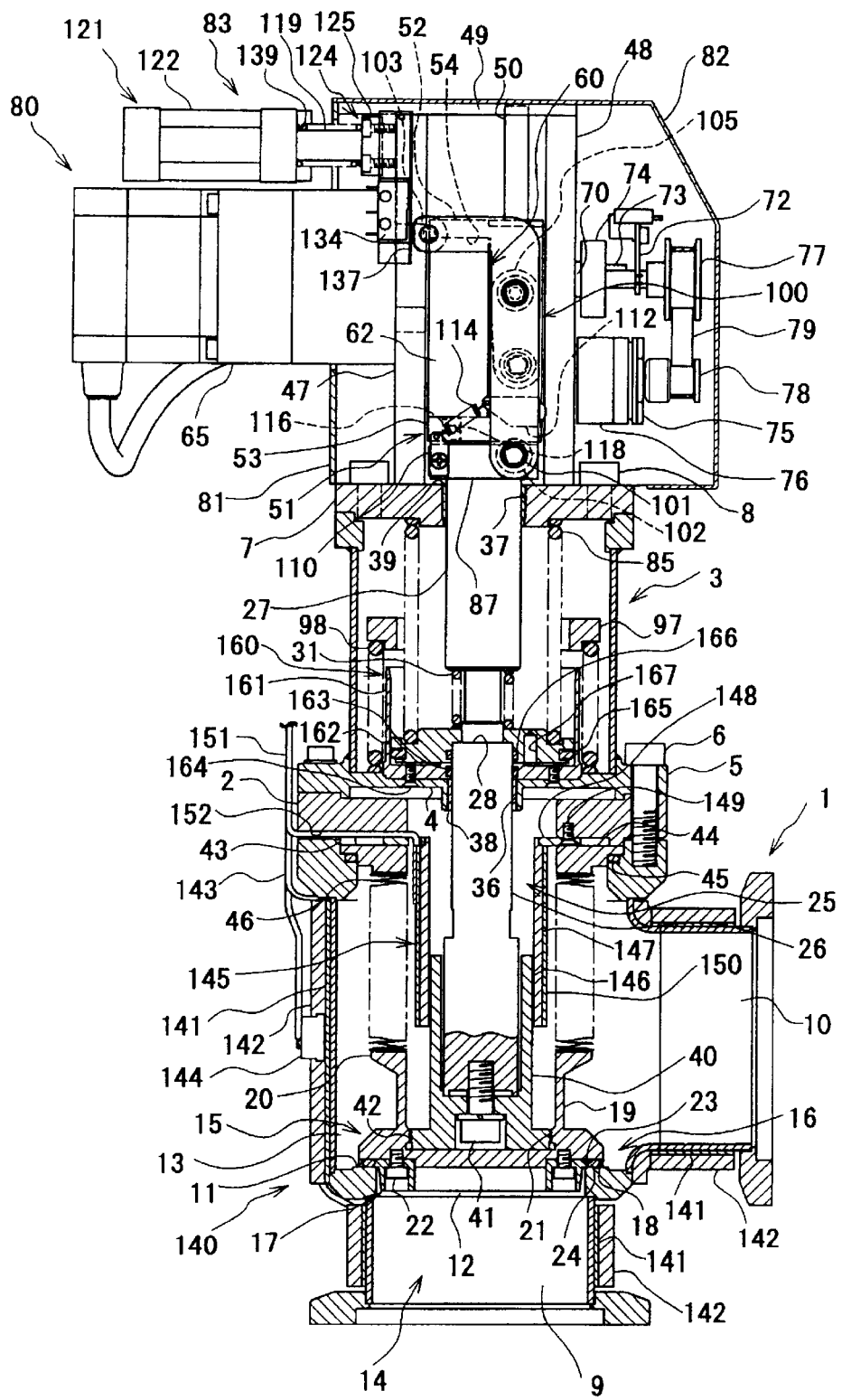
Figure 15:
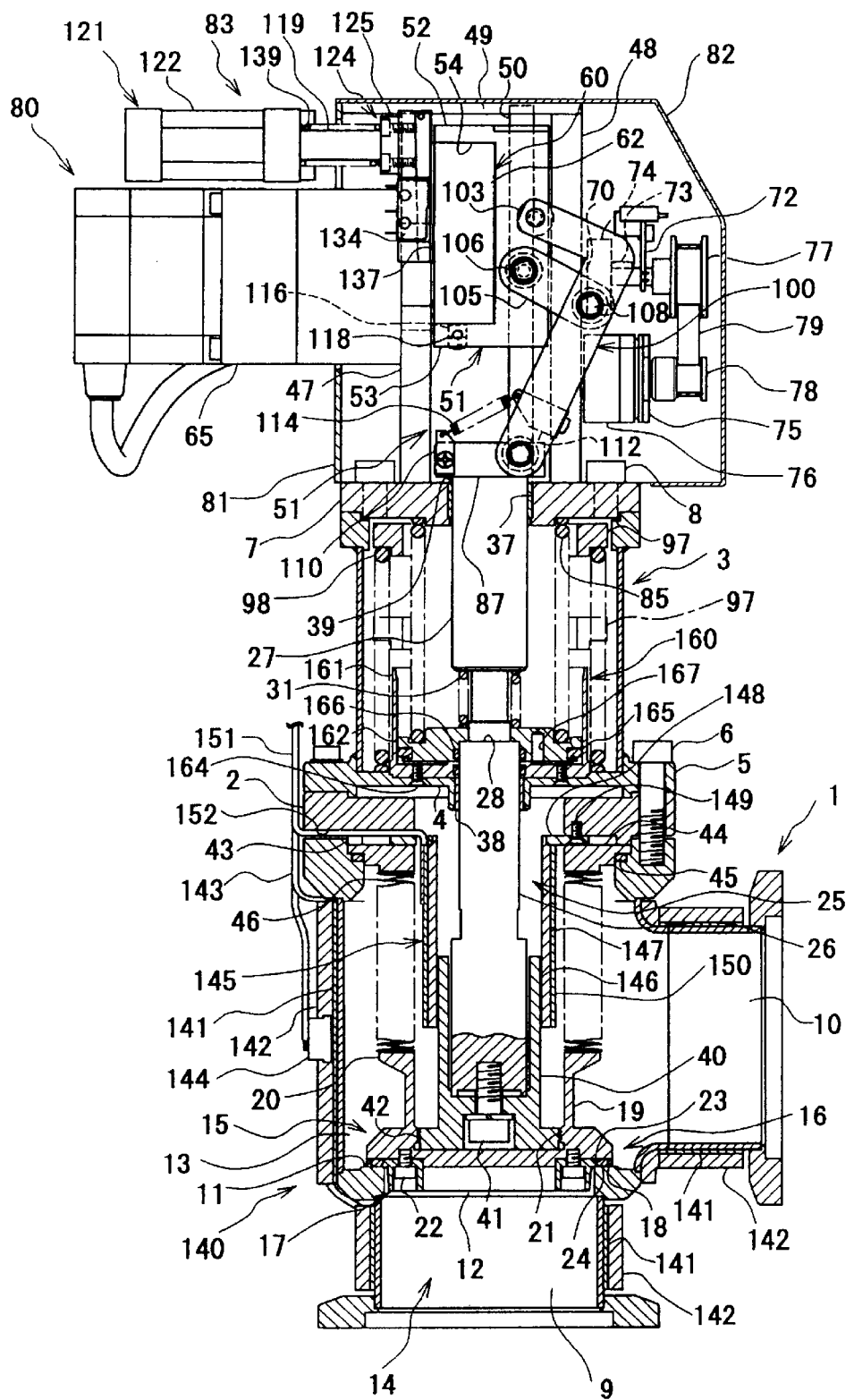

Referring to FIGS. 13 through 15 showing the second embodiment of the present invention, the valve is provided with a shock absorber 160.

In the first embodiment of the present invention, the emergency cutoff mechanism 83 is released from the slider 51 in an emergency, and the valve disc 15 is lowered by the spring 85 to close the hole 12. If the lowering speed is excessively high, the valve disc 15 collides with the valve seat 11. The collision may generate the vibration of the valve, which causes defective products such as deflection of wafers. In addition particles generate because of grinding of the seal ring 24 with the valve seat 11. The second embodiment resolves such a problem by the shock absorber 160.

The shock absorber 160 comprises a cylinder 161 having a bottom plate 161a, and a piston 162. The bottom plate 161a is slidably mounted on the large diameter stem 26a through a seal ring 163 and fixed to the cylindrical connector 40 of the bonnet 3 by screws 164.

The piston 162 corresponds to the spring retainer 84 and is mounted on the large diameter stem 26a through a seal ring 166 and mounted on the middle diameter stem 26b. The piston 162 has a seal ring 165 which is adapted to be slidably engaged with the inside wall of the cylinder 161. A shoulder of the inside wall of the piston is pressed against the shoulder 28 by the spring 85. An air discharge passage 167 is formed in the piston 162. Although the spring 31 is disposed between the stem adapter 27 and the piston 162, the spring 31 may be disposed between the stem adapter 27 and the shoulder of the stem 26b similarly to the first embodiment.

In the normal power supply condition, the valve disc 15 closes the hole 12 and opens in the same manner as the first embodiment. When the stem 26 is lowered, the piston 162 enters into the cylinder as shown in FIG. 14, while discharging the air in the cylinder 161 passing through the air discharge passage 167. However, since the valve disc 15 is driven by the actuator 80, the shock absorber 160 has no influence on the valve disc.

In an emergency, the emergency cutoff mechanism 83 is released from the actuator 80, and the stem 26 is lowered by the spring 85 in the same manner as the first embodiment. The piston 162 enters into the cylinder 161 to compress air in the cylinder 161, while discharging the air passing through the air discharge passage 167. The air discharge passage 167 is so arranged that the pressure of the compressed air in the cylinder 161 becomes maximum at a stroke end position. Consequently, the speed of the valve disc 15 is reduced immediately before the contacting with the valve seat 11. Thus, the valve disc 15 softly engages with the valve seat.

In accordance with the present invention, the valve passage is immediately closed in an emergency by releasing an emergency cutoff mechanism from the actuator, so that the manufacturing operation can be continued without stopping.

While the invention has been described in conjunction with preferred specific embodiment thereof, it will be understood that this description is intended to illustrate and not limit the scope of the invention, which is defined by the following claims.

What is claimed is:

1. A valve for controlling a flow rate of gas, comprising:
    a valve body having a gas-flowing passage, said gas flowing passage including a hole;
    a valve disc for closing said hole;
    a valve operating member for operating said valve disc;
    an actuator for operating said valve operating member, wherein said actuator comprising a motor, a horizontal drive shaft that is an output shaft of said motor, an eccentric cam secured to said horizontal drive shaft, and a slider connected to said valve disc and movable vertically by said eccentric cam;
    an emergency cut-off device connected to said valve disc and releasably connected to said actuator;
    means for releasing said emergency cut-off device from said actuator in case of an emergency;
    means for urging said valve disc to said hole when said emergency cut-off device is released from said actuator; and,
    said emergency cut-off device comprising a first link having a distal end connected to said slider and a proximal end rotatably connected to said valve operating member, a roller rotatably supported on a distal end portion of said first link, a second link having a distal end rotatably connected to an intermediate portion of said first link and a proximal end rotatably connected to said slider of said actuator.

2. The valve according to claim 1, wherein said means for urging is a spring.

3. The valve according to claim 1, wherein said means for releasing is an air cylinder device.

4. The valve according to claim 3, wherein said air cylinder comprises a piston rod connected to said latch device, and a plurality of springs for urging the latch device and said second link to an unstable position, and wherein compressed air is supplied to a piston rod chamber for keeping said second link at a stable position.

5. The valve according to claim 4, further comprising an electromagnetic valve means for discharging the compressed air in said piston rod side chamber when electric power supplied to the electromagnetic valve means is cut-off, and wherein said plurality of springs move said second link to said unstable position.

6. The valve according to claim 1, further comprising a connector base connected to said first link and said valve disc, and a latch device having a guide surface on which said roller is rotatable along a moving direction of said valve operating member and said valve disc.

7. The valve according to claim 6, where in said latch device is movably disposed in a direction substantially at right angles relative to said moving direction of said valve operating member and said valve disc wherein a center of connection between said second link and said slider is positioned further apart from said guide surface than a line connecting a center of connection between said proximal end of said first link and said valve operating member and a center of connection between said first link and said second link, and wherein said roller becomes rotatable on said guide surface in a normal operation state in which association between said slider and said valve operating member is retained, wherein said roller is pushed to rotate said first link and said second link, whereby releasing the association between said slider and said valve operating member.

8. The valve according to claim 6, further comprising a stem adapter wherein a stem is slidably engaged with said stem adapter, and a spring disposed between said stem and said stem adapter.

9. The valve according to claim 8, further comprising a shock absorber for reducing the speed of said valve immediately before closing said hole.

10. The valve according to claim 9, wherein said shock absorber comprises a cylinder having a bottom plate secured to said valve body and slidably engaged with said stem, and a piston secured to said stem and slidably inserted in said cylinder.

11. The valve according to claim 10, further comprising a first spring for urging the valve to said hole, wherein said first spring is retained by said piston.

12. The valve according to claim 10, wherein said piston has an air discharge passage.

* * * * *